United States Patent Office 3,509,077
Patented Apr. 28, 1970

3,509,077
**RIGID POLYURETHANE FOAMS FROM
CERTAIN POLYETHER MIXTURES**
Andrew Shultz, Williamsville, N.Y., assignor to Allied
Chemical Corporation, New York, N.Y., a corporation
of New York
No Drawing. Filed July 7, 1966, Ser. No. 563,392
Int. Cl. C08g 22/44, 22/08
U.S. Cl. 260—2.5                                    7 Claims

ABSTRACT OF THE DISCLOSURE

Rigid cellular urethanes having improved impact resistance and compressive strength obtained by the reaction of an organic polyisocyanate with a mixture of polyalkylene ether polyols comprising about 90 to 99 weight percent of a polyol having a hydroxyl number of from 360 to 560 and about 1 to 10 weight percent of a polyalkylene ether polyol having a hydroxyl number of from about 20 to 160 in the presence of a blowing agent.

---

This invention relates to the preparation of cellular urethane products. More particularly it relates to a method for making improved cellular urethane products and to novel polyol mixtures useful therefor.

It has been proposed heretofore to react an organic polyisocyanate with a polyalkylene ether polyol or a mixture of polyalkylene ether polyols to produce a rigid product having a porous structure. Such products have been prepared preferably by a one-step process in which the polyalkylene ether polyol, organic polyisocyanate, catalyst, foaming agent and other components are all mixed together at one time. It has been necessary, however, in order to produce a dimensionally stable rigid cellular urethane structure by such a process, to employ a polyalkylene ether polyol of relatively high functionality, that is a polyalkylene ether polyol of high hydroxyl number, about 450 to 500 to obtain a high cross-link density within the structure, sufficient to impart dimensional stability to the resulting foam. It has been found, also, that for a particular foam formulation, as the hydroxyl number of the polyalkylene ether polyol component increases, the friability of the resulting foams increases, that is, as the hydroxyl number of the polyol component of a formulation increases, the resulting foams exhibit a corresponding decrease in impact resistance and compressive strength. Conversely as the hydroxyl number of the polyol component of a formulation is decreased, the resulting foams become less friable, that is they become less brittle and do not crumble on impact.

Unfortunately, improvement in friability is accompanied simultaneously by deterioration of dimensional stability. This latter change is due primarily to the absence in low hydroxyl number polyols of sufficient functionality (i.e. branching) to produce adequate cross-link density. In the extreme case, as the polyol hydroxyl number decreases below about 360, the deterioration of dimensional stability of the resultant foams increases at a very rapid rate.

It is therefore a principal object of this invention to provide dimensionally stably rigid urethane structures characterized by excellent impact resistance and compressive strength.

It is another object of this invention to provide a one-step process for the production of such structures.

Other objects of this invention will be apparent from the following detailed description thereof.

I have discovered that a rigid cellular urethane structure of improved impact resistance and compressive strength, that is of higher friability index rating, can be derived from a urethane foam formulation comprising a relatively high hydroxyl number polyalkylene ether polyol having a hydroxyl number of from about 360 to about 560 and a polyisocyanate, which foam formulation normally produces a cellular urethane structure deficient in impact resistance and compressive strength, by incorporating into said formulation a small, but significant amount of a relatively low hydroxyl number polyalkylene ether polyol having a hydroxyl number of about 20 to about 160. That is, while it is generally known that, for a particular foam formulation, the impact resistance and compressive strength of a rigid foam derived from said formulation tend to improve as the overall hydroxyl number of the polyalkylene ether component of said formulation is decreased, I have discovered that incorporation of a small amount of a low hydroxyl number polyalkylene ether polyol into a foam formulation is accompanied by a surprising improvement in the impact resistance and compressive strength of the foam derived from said formulation which is considerably larger than that expected from the accompanying decrease in the overall hydroxyl number of the polyalkylene ether polyol component of said formulation due to the addition of said small amount of low hydroxyl number polyalkylene ether polyol thereto.

It is known from previous experiments that there is a direct relationship between hydroxyl number and friability. For example, when a crude undistilled polyisocyanate composition as described herein below is used as the polyisocyanate together with polyalkylene ether polyol the derived rigid foam structures have increased friability index as the hydroxyl number of the polyalkylene ether polyol increases. Furthermore, for such rigid foam structures, a friability index of about 80 is to be expected from a polyol having a hydroxyl number of about 460 and a decrease of about 12 in hydroxyl number of the polyalkylene ether polyol component of the foam formulation in the 440 to 460 hydroxyl number range should produce an increase of about 3 units in friability rating, provided that all foams are produced under similar conditions. Accordingly, foam derived from Nacconate 4040 and a polyol mixture comprising about 97 weight percent of a polyol having a hydroxyl number of 460 and about 3 weight percent of a polyol having a hydroxyl number of 56, which polyol mixture has an overall hydroxyl number of $(460 \times .97) + (.03 \times 56) = 448$ should exhibit an improvement in friability index of about 3 to 4 units over a foam identically prepared from the polyol of 460 hydroxyl number. Further information concerning previous experiments can be found by consulting Technical Bulletin TS–16, Allied Chemical Corporation, National Aniline Division, published in 1964, with specific reference to Figure 4. The present invention arose from the surprising discovery that contrary to expectations, the improvement in friability index is not 3 to 4 units when the overall hydroxyl number of the polyol component is decreased but instead, an improvement in the impact resistance and compressive strength of the resulting foam corresponding to as much as 42 friability index units is observed. Furthermore, such an improvement in the impact resistance and compressive strength of the foam is not accompanied by any noticeable deterioration in other important properties of the foam.

Surprisingly the impact resistance and compressive strength of the foam product is not further improved by incorporation of additional amounts of the low hydroxyl number polyol. As shown in the examples below, at concentrations of the 56 hydroxyl number polyol in the polyol mixture corresponding to about 3 weight percent and an overall hydroxyl number of $(460 \times .98) + (56 \times .03) = 441$, a friability index corresponding to an improvement of 42 friability index units is observed. However, at concentrations of the 56 hydroxyl number polyol corresponding to about 6 weight percent and an overall hydroxyl number of $(460 \times .94) + (56 \times .06) = 436$, a friability index corresponding to an improvement of only about 25 friability index units is observed for the resulting foam. Similarly when the concentration of low hydroxyl number polyol is reduced to 1 percent of the total polyol mixture thereby producing a polyol mixture with an overall hydroxyl number of $(460 \times .99) + (56 \times .01) = 461$, an improvement in impact resistance and compressive strength corresponding to only 16 friability index units is observed in the resulting foam. Hence, while the specific concentration has not been establish at which a maximum improvement in friability index occurs in a foam due to incorporation of a small amount of a low hydroxyl number polyol into a foam formulation, substantial improvements are observed at relative concentrations of low hydroxyl number polyol corresponding to from about 1 to about 10 weight percent, preferably from about 2 to about 6 weight percent, of the total polyol component of the foam formulation, which improvements cannot be predicted or accounted for from the small decrease in overall hydroxyl number of the polyalkylene ether polyol component of said foam formulation.

The friability index represents the number of inch-pounds required to penetrate a foam sample a depth of one inch and is derived from the indentation of the foam (after a one hour rest period) attained as a result of a 20 inch-pound impact of a cylinder one inch in diameter. Further information and details of the determination of the friability index may be found by consulting "Test Methods for the Evaluation of Rigid Urethane Foam," Standard Test Method RF–TM6, Allied Chemical Corporation, National Aniline Division, pp. 1 to 2, published and distributed April, 1964 and Dickert et al., "Molding of One-Shot Rigid Urethane Foams," Chemical Engineering Progress, vol. 59, No. 9 (1963), pp. 33 to 38, especially column 2 of page 34.

The low hydroxyl number polyol component of the polyol mixture useful in the process of my invention may be any polyol or mixture of polyols having a hydroxyl number of about 20 to 160, preferably 40 to about 120, which polyols are useful in the production of flexible cellular urethane products. Such polyols are polyhydroxy compounds of the general formula

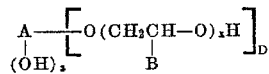

wherein A is an aliphatic radical, B is hydrogen or a methyl or phenyl group, $x$ is an integer from 1 to 5, D is an integer from 1 to 3 and $z$ is an integer from 0–1. Preferably these polyols have from two to three terminal hydroxyl groups per molecule, which hydroxyl groups are reactive towards isocyanate groups. Preferably these polyols have a hydroxyl number in the range of from about 40 to about 120 for maximum improvement in the impact resistance and compressive strength of the foam derived from a polyol mixture comprising a high hydroxyl number polyol and from about 1 to about 10 weight percent of the high hydroxyl number polyol, of a low hydroxyl number polyol as specified above.

The high hydroxyl number polyol components of the polyol mixtures useful in the process of my invention having a hydroxyl number of 360 to 560, preferably 440 to 480 also have the general structure already indicated, except that in such polyols D is an integer from 1 to 10, generally from 5 to 7 or higher and $z$ is an integer from 0 to 9.

The low hydroxyl number polyalkylene ether polyols useful in the process of my invention may be prepared by condensation of an alkylene oxide or an aralkylene oxide with for example, ethylene glycol, propylene glycol, hexanediol, glycerol, trimethylol propane and the like, using methods well-known in the art. Similarly, the high hydroxyl number polyols may be prepared by condensation of an alkylene oxide or an aralkylene oxide with, for example, fructose, sucrose, maltose, sorbitol, tetramethylol propane and the like. Mixtures of these reactants may also be used.

Various polyisocyanates which may be successfully employed in the process of my invention include any one or a mixture of the following polyisocyanates: 1,3-phenylene diisocyanate, 1,4-phenylene diisocyanate, 2,4-toluenediisocyanate, 2,6-tolylene diisocyanate, 1,5-naphthalene diisocyanate, 4,4'-methylene bis(phenylisocyanate), 4,4'-methylene bis(cyclohexylisocyanate), hexamethylene diisocyanate and the like. Especially suitable in the process of my invention are undistilled polyisocyanate compositions derived by phosgenation of 2,4- and 2,6-toluenediamines, for example such as described in French Patent 1,375,975, and mixtures of polyisocyanates such as obtained by phosgenation of a mixture of polyamines derived by the acid-catalyzed condensation of aniline and an aldehyde, especially formaldehyde, for example such as described in U.S. Patent 2,683,730.

The improved rigid cellular urethane products of my invention are prepared in the presence of a blowing agent, preferably a low boiling fluorocarbon and in the added presence, whenever desired, of various accelerators or catalysts, fillers, colorants, emulsifiers, dispersants and the like, as is well known in the art, depending upon the particular application for which the products are intended.

My invention may be better understood from the following examples which, however, are not intended to limit my invention to the particular reactants and conditions recited therein, except as otherwise specifically defined in the appended claims. In the examples, the sucrose polypropylene oxide polyol of hydroxyl number 700 is added to improve the flowability of the structures produced.

EXAMPLE 1

A premix is prepared in accordance with the following formulation:

300 grams sucrose-glycerol initiated polypropylene oxide polyol of hydroxyl number 460 derived by addition of propylene oxide to a mixture of sucrose and glycerol.
25 grams sucrose initiated polypropylene oxide polyol of hydroxyl number 700 derived by addition of propylene oxide to sucrose.
3 grams glycerol initiated polypropylene oxide polyol of hydroxyl number 56 and derived by addition of propylene oxide to glycerol.
1.3 grams dibutyl tin dilaurate.
2.5 grams dimethylethanolamine.
3 grams silicone oil surfactant (Silicone L–520 UCC).
109 grams monofluorotrichloromethane.

The premix is blended thoroughly and foamed with 306 parts of undistilled toluenediamine phosgenation product, prepared as described in French Patent 1,375,975 and having an amine equivalent of 108, to yield a cellular product having a density of 1.81 lbs./cu. ft. and a friability index of 96. The ingredients are mixed for 20 seconds, the mix has a cream time of 22 seconds, a gel time of 47 seconds and it becomes tack-free in 65 seconds.

EXAMPLES 2–6

In the following examples, presented in tabular form, the procedure of Example 1 is followed, line $a$ represents parts of polyol having a hydroxyl number of 460, line $b$ represents parts of polyol having a hydroxyl number of 700, line $c$ represents parts of polyol having a hydroxyl number of 56 and line $d$ represents the amount of undistilled toluenediamine phosgenation product employed in the foam formulation.

| Example No. | 2 | 3 | 4 | 5 | 6 |
|---|---|---|---|---|---|
| (a) Polyol OH #460 | 300 | 300 | 300 | 300 | 300 |
| (b) Polyol OH #700 | 25 | 25 | 25 | 25 | 25 |
| (c) Polyol OH #56 | | 6 | 9 | 18 | 27 |
| Dibutyl tin dilaurate | 1.3 | 1.3 | 1.3 | 1.3 | 1.3 |
| Dimethylethanolamine | 2.5 | 2.5 | 2.5 | 2.5 | 2.5 |
| Silicone surfactant | 3 | 3 | 3 | 3 | 3 |
| Monofluorotrichloromethane | 108 | 109 | 110 | 111 | 113 |
| (d) Phosgenation products | 306 | 307 | 307 | 308 | 309 |
| Mix time (sec.) | 20 | 20 | 20 | 20 | 20 |
| Cream time (sec.) | 22 | 23 | 23 | 24 | 25 |
| Gel time (sec.) | 40 | 43 | 45 | 49 | 54 |
| Tack free time (sec.) | 55 | 60 | 60 | 65 | 70 |
| Density (lbs./cu. ft.$^{-1}$) | 1.80 | 1.79 | 1.87 | 1.82 | 1.78 |
| Friability Index | 81 | 112 | 123 | 105 | 104 |

From the examples, it can be readily concluded that maximum improvement in impact resistance and compressive strength (112 and 123 friability index ratings) for the foams, is reached at about 2 and 3 parts low hydroxyl number polyol per hundred parts total polyol in the foam formulation, the improvement diminishing and leveling off at higher concentrations (105 and 104 friability index units are observed at 6 and 9 parts low hydroxyl number polyol per hundred parts total polyol in the foam formulation, respectively).

I claim:

1. A rigid cellular urethane structure of improved impact resistance and compressive strength, which is the reaction product of an organic polyisocyanate and a polyalkylene ether polyol mixture comprising about 90 to about 99 weight percent of a polyalkylene ether polyol having a hydroxyl number of from about 360 to about 560 and about 1 to about 10 weight percent of a polyalkylene ether polyol having a hydroxyl number of from about 20 to about 160 in the presence of a blowing agent.

2. A rigid cellular urethane structure of improved impact resistance and compressive strength, as claimed in claim 1, wherein said polyalkylene ether polyol mixture contains about 2 to about 6 weight percent of a polyalkylene ether polyol having a hydroxyl number of from about 40 to about 120, the remainder of said mixture being a polyalkylene ether polyol having a hydroxyl number of about 440 to about 480.

3. A rigid cellular urethane structure of improved impact resistance and compressive strength, as claimed in claim 1, wherein said polyalkylene ether polyol mixture contains about 2 to about 3 weight percent of a polyalkylene ether polyol having a hydroxyl number of 56, the remainder of said mixture being a polyalkylene ether polyol having a hydroxyl number of 460.

4. A rigid cellular urethane structure of improved impact resistance and compressive strength, as claimed in claim 1, wherein said polyol mixture additionally contains up to about 8 weight percent of a polyalkylene ether polyol having hydroxyl number of about 700.

5. A rigid cellular urethane structure of improved impact resistance and compressive strength, as claimed in claim 3 wherein said polyol mixture additionally contains about 8 weight percent of a polyalkylene ether polyol having a hydroxyl number of 700.

6. A rigid cellular urethane structure of improved impact resistance and compressive strength, as claimed in claim 1, wherein said polyisocyanate is an undistilled polyisocyanate derived by phosgenation of 2,4- and 2,6-toluenediamines.

7. A rigid cellular urethane structure of improved impact resistance and compressive strength, as claimed in claim 1, wherein said polyisocyanate is a mixture of polyisocyanates obtained by phosgenation of a mixture of polyamines derived by the acid-catalyzed condensation of aniline and an aldehyde.

References Cited

UNITED STATES PATENTS

| 3,288,732 | 11/1966 | Chapman et al. | 260—2.5 |
| 3,194,770 | 7/1965 | Hostettler et al. | 252—431 |
| 3,288,732 | 11/1966 | Chapman et al. | 260—2.5 |

FOREIGN PATENTS

| 638,574 | 3/1962 | Canada. |
| 1,378,039 | 5/1964 | France. |
| 734,988 | 5/1966 | Canada. |

OTHER REFERENCES

"Thanol RS–500," Jefferson Chem. Co., 1963.
"Thanol RS–700," Jefferson Chem. Co., 1963.
"Thanol F–3000," Jefferson Chem. Co., Mar. 2, 1964.
Barringer, Bulletin HR–26, E.I. duPont, April 1958, page 44.

DONALD E. CZAJA, Primary Examiner

M. J. WELSH, Assistant Examiner